US012335042B2

(12) United States Patent
Yuan et al.

(10) Patent No.: US 12,335,042 B2
(45) Date of Patent: Jun. 17, 2025

(54) UCI ENHANCEMENT FOR UPLINK TRANSMISSION

(71) Applicant: QUALCOMM Incorporated, San Diego, CA (US)

(72) Inventors: Fang Yuan, Beijing (CN); Kiran Venugopal, Green Brook, NJ (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/758,457

(22) PCT Filed: Feb. 12, 2020

(86) PCT No.: PCT/CN2020/074798
§ 371 (c)(1),
(2) Date: Jul. 6, 2022

(87) PCT Pub. No.: WO2021/159287
PCT Pub. Date: Aug. 19, 2021

(65) Prior Publication Data
US 2023/0029963 A1    Feb. 2, 2023

(51) Int. Cl.
*H04L 1/1812* (2023.01)
*H04L 1/1607* (2023.01)
*H04L 5/00* (2006.01)

(52) U.S. Cl.
CPC .......... *H04L 1/1671* (2013.01); *H04L 1/1812* (2013.01); *H04L 5/0055* (2013.01); *H04L 5/0094* (2013.01)

(58) Field of Classification Search
CPC ... H04L 1/1671; H04L 1/1812; H04L 5/0055; H04L 5/0094; H04L 1/1854; H04L 1/1861; H04L 1/1896; H04L 1/1614
See application file for complete search history.

(56) References Cited

U.S. PATENT DOCUMENTS 10,411,864 B2   9/2019  Wang et al.
10,469,234 B2*  11/2019 Yang .................... H04L 1/1861
(Continued)

FOREIGN PATENT DOCUMENTS

WO   WO-2011099591 A1   8/2011
WO   WO-2013113142 A1   8/2013
(Continued)

OTHER PUBLICATIONS

International Search Report and Written Opinion—PCT/CN2020/074798—ISA/EPO—Jun. 29, 2020.
(Continued)

*Primary Examiner* — Atique Ahmed
(74) *Attorney, Agent, or Firm* — Harrity & Harrity, LLP (57) ABSTRACT

Various aspects of the present disclosure generally relate to wireless communication. In some aspects, a user equipment (LIE) may select uplink communication resources to be used to transmit enhanced uplink control information (UCI) to a base station based at least in part on a size of a hybrid automatic repeat request (HARQ) codebook and an enhancement number, and transmit the enhanced UCI using the selected uplink communication resources, the enhanced UCI comprising a set of feedback bits and a set of enhancement bits, the set of feedback bits comprising at least one negative acknowledgement (NACK) bit, and wherein the set of enhancement hits indicate information associated with the at least one NACK bit. Numerous other aspects are provided.

30 Claims, 7 Drawing Sheets

(56) References Cited

U.S. PATENT DOCUMENTS

| | | | |
|---|---|---|---|
| 10,785,753 B1* | 9/2020 | Li | H04L 5/0044 |
| 2012/0087254 A1 | 4/2012 | Yin et al. | |
| 2014/0003452 A1* | 1/2014 | Han | H04L 1/1657 |
| | | | 370/474 |
| 2014/0226608 A1 | 8/2014 | Seo et al. | |
| 2015/0365931 A1* | 12/2015 | Ng | H04L 1/1887 |
| | | | 370/329 |
| 2019/0074929 A1 | 3/2019 | Aiba et al. | |
| 2019/0150122 A1 | 5/2019 | Ying et al. | |
| 2019/0261391 A1* | 8/2019 | Kundu | H04L 1/0073 |
| 2020/0252167 A1 | 8/2020 | Kwak et al. | |
| 2020/0252928 A1* | 8/2020 | Park | H04L 5/00 |
| 2020/0305126 A1* | 9/2020 | Li | H04L 1/1614 |
| 2020/0374045 A1* | 11/2020 | Yin | H04B 7/0456 |
| 2020/0403751 A1* | 12/2020 | Baldemair | H04L 5/0055 |
| 2021/0029605 A1* | 1/2021 | Kadiri | H04W 36/085 |
| 2021/0176011 A1* | 6/2021 | Lei | H04L 1/1896 |

FOREIGN PATENT DOCUMENTS

| | | | | |
|---|---|---|---|---|
| WO | WO-2017024532 A1 * | 2/2017 | | H04L 1/0071 |
| WO | 2018144990 A1 | 8/2018 | | |
| WO | WO-2019141870 A2 | 7/2019 | | |

OTHER PUBLICATIONS

Fujitsu: "DL Scheduling and UL Control Information for URLLC", 3GPP TSG RAN WG1 NR Ad-Hoc Meeting, R1-1700658 DL Scheduling and UL Control Information for URLLC Final, 3rd Generation Partnership Project (3GPP), Mobile Competence Centre, 650, Route Des Lucioles, F-06921 Sophia-Antipolis, vol. RAN WG1, No. Spokane, USA, Jan. 16, 2017-Jan. 20, 2017, 4 Pages, Jan. 16, 2017 (Jan. 16, 2017), XP051208182, pp. 2, 3.

Supplementary European Search Report—EP20918640—Search Authority—The Hague—Sep. 28, 2023.

ZTE, et al., "URLLC PHY Enhancements", 3GPP TSG RAN WG1 Meeting #94, R1-1808211, URLLC PHY Enhancements, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, 10 Pages, Aug. 11, 2018 (Aug. 11, 2018), XP051515596, pp. 8-9.

Fujitsu: "DL Scheduling and UL Control Information for URLLC", 3GPP TSG RAN WG1 NR Ad-Hoc Meeting, R1-1700658, Spokane, USA, Jan. 16, 2017-Jan. 20, 2017, Jan. 9, 2017, pp. 1-4.

ZTE, et al., "URLLC PHY Enhancements", 3GPP TSG RAN WG1 Meeting #94, R1-1808211, Gothenburg, Sweden, Aug. 20, 2018-Aug. 24, 2018, Jan. 11, 2018, pp. 1-10, Articles 4-10.

* cited by examiner

UCI ENHANCEMENT FOR UPLINK TRANSMISSION

CROSS-REFERENCE TO RELATED APPLICATION

This application is a 371 national stage of Patent Cooperation Treaty (PCT) Application No. PCT/CN2020/074798 filed on Feb. 12, 2020, entitled "UCI ENHANCEMENT FOR UPLINK TRANSMISSION," which is hereby expressly incorporated by reference herein.

FIELD OF THE DISCLOSURE

Aspects of the present disclosure generally relate to wireless communication and to techniques and apparatuses for uplink control information (UCI) enhancement for uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting uplink communication resources to be used to transmit enhanced uplink control information (UCI) to a base station based at least in part on a size of a hybrid automatic repeat request (HARQ) codebook and an enhancement number; and transmitting the enhanced UCI using the selected uplink communication resources, the enhanced UCI comprising a set of feedback bits and a set of enhancement bits, the set of feedback bits comprising at least one negative acknowledgement (NACK) bit, and wherein the set of enhancement bits indicate information associated with the at least one NACK bit.

In some aspects, a method of wireless communication, performed by a base station (BS), may include transmitting, to a UE, an indication of an enhancement number, wherein the enhancement number is based at least in part on an estimated number of NACK bits in a set of feedback bits; transmitting, to the UE, a physical downlink shared channel (PDSCH) communication; and receiving enhanced UCI via uplink communication resources selected by the UE based at least in part on a size of a HARQ codebook and the enhancement number.

In some aspects, a UE for wireless communication may include memory and one or more processors operatively coupled to the memory. The memory and the one or more processors may be configured to select uplink communication resources to be used to transmit enhanced UCI to a base station based at least in part on a size of a HARQ codebook and an enhancement number; and transmit the enhanced UCI using the selected uplink communication resources, the enhanced UCI comprising a set of feedback bits and a set of enhancement bits, the set of feedback bits comprising at least one NACK bit, and wherein the set of enhancement bits indicate information associated with the at least one NACK bit.

In some aspects, a BS for wireless communication may include memory and one or more processors operatively coupled to the memory. The memory and the one or more processors may be configured to transmit, to a UE, an indication of an enhancement number, wherein the enhancement number is based at least in part on an estimated number of NACK bits in a set of feedback bits; transmit, to the UE, a PDSCH communication; and receive enhanced UCI via uplink communication resources selected by the UE based at least in part on a size of a HARQ codebook and the enhancement number.

In some aspects, a non-transitory computer-readable medium may store one or more instructions for wireless communication. The one or more instructions, when executed by one or more processors of a UE, may cause the one or more processors to: select uplink communication resources to be used to transmit enhanced UCI to a BS based at least in part on a size of a HARQ codebook and an enhancement number; and transmit the enhanced UCI using the selected uplink communication resources, the enhanced UCI comprising a set of feedback bits and a set of enhancement bits, the set of feedback bits comprising at least one NACK bit, and wherein the set of enhancement bits indicate information associated with the at least one NACK bit.

In some aspects, a non-transitory computer-readable medium may store one or more instructions for wireless communication. The one or more instructions, when executed by one or more processors of a BS, may cause the one or more processors to: transmit, to a UE, an indication of an enhancement number, wherein the enhancement number is based at least in part on an estimated number of NACK bits in a set of feedback bits; transmit, to the UE, a PDSCH communication; and receive enhanced UCI via uplink communication resources selected by the UE based at least in part on a size of a HARQ codebook and the enhancement number.

In some aspects, an apparatus for wireless communication may include means for selecting uplink communication resources to be used to transmit enhanced UCI to a base station based at least in part on a size of a HARQ codebook and an enhancement number; and means for transmitting the enhanced UCI using the selected uplink communication resources, the enhanced UCI comprising a set of feedback bits and a set of enhancement bits, the set of feedback bits comprising at least one NACK bit, and wherein the set of enhancement bits indicate information associated with the at least one NACK bit.

In some aspects, an apparatus for wireless communication may include means for transmitting, to a UE, an indication of an enhancement number, wherein the enhancement number is based at least in part on an estimated number of NACK bits in a set of feedback bits; means for transmitting, to the UE, a PDSCH communication; and means for receiving enhanced UCI via uplink communication resources selected by the UE based at least in part on a size of a HARQ codebook and the enhancement number.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
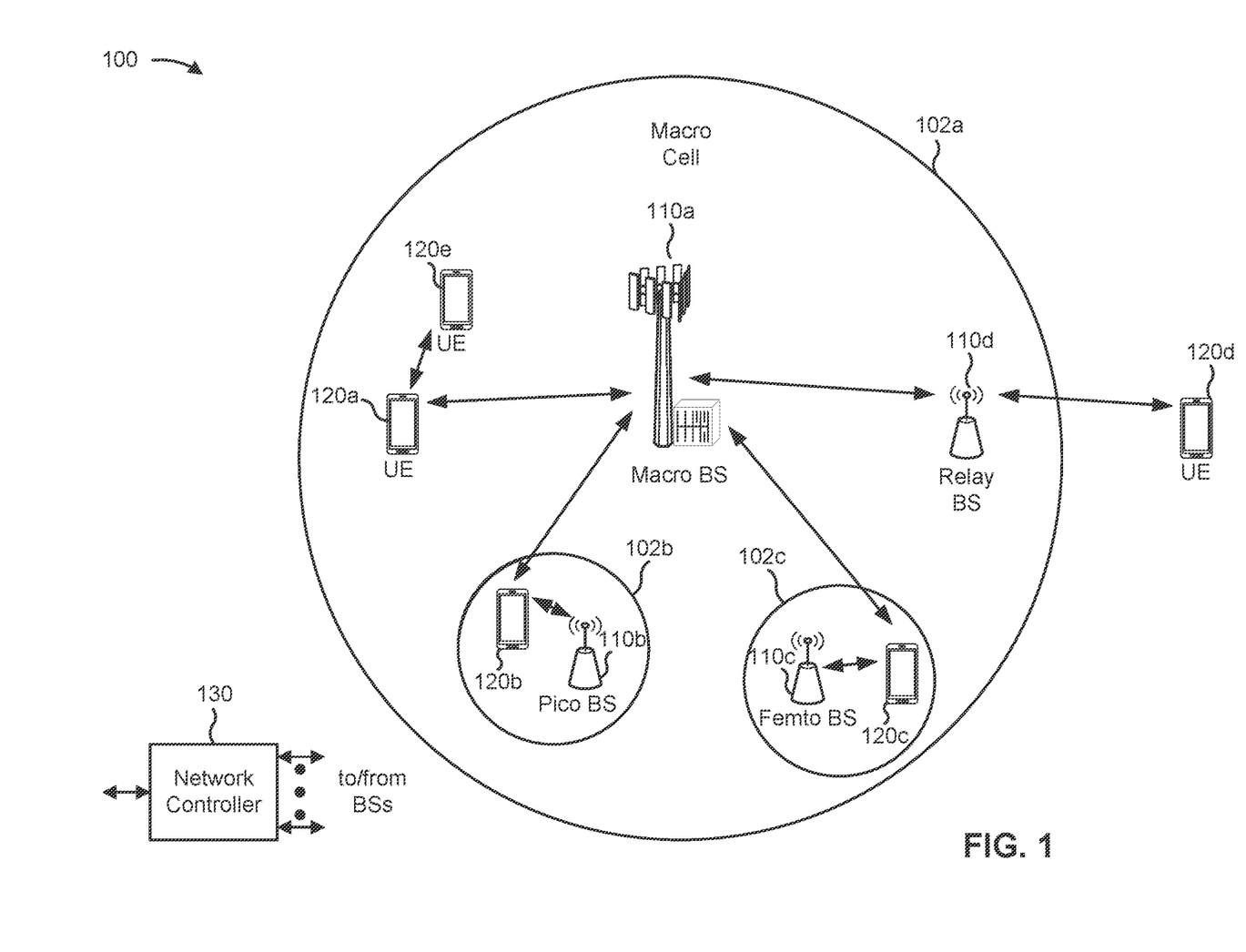
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
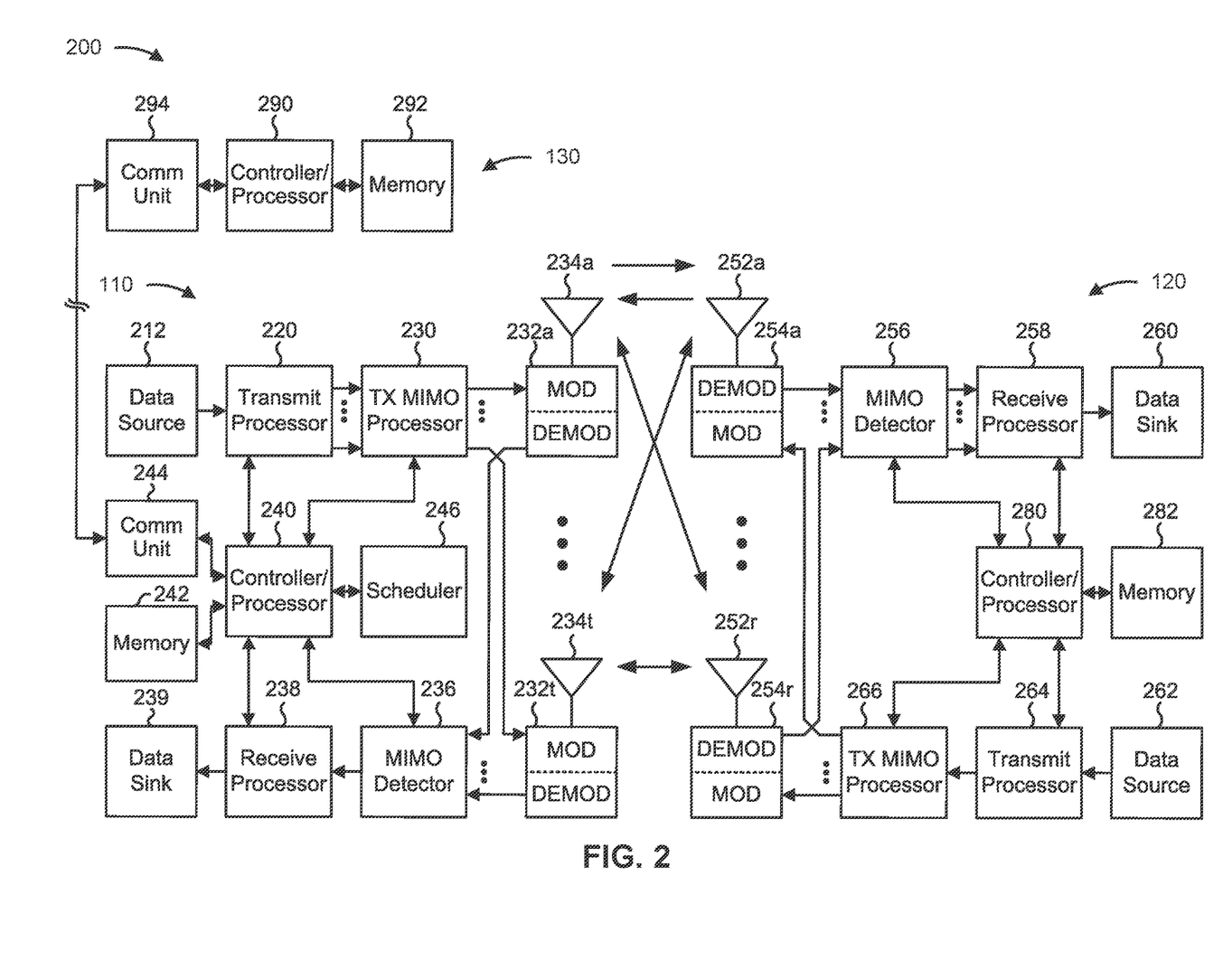
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink control information (UCI) enhancement for uplink transmission, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for selecting uplink communication resources to be used to transmit enhanced UCI to a base station based at least in part on a size of a hybrid automatic repeat request (HARQ) codebook and an enhancement number, means for transmitting the enhanced UCI using the selected uplink communication resources, the enhanced UCI comprising a set of feedback bits and a set of enhancement bits, the set of feedback bits comprising at least one negative acknowledgement (NACK) bit, and wherein the set of enhancement bits indicate information associated with the at least one NACK bit, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, an indication of an enhancement number, wherein the enhancement number is based at least in part on an estimated number of NACK bits in a set of feedback bits, means for transmitting, to the UE, a physical downlink shared channel (PDSCH) communication, means for receiving enhanced UCI via uplink communication resources selected by the UE based at least in part on a size of a HARQ codebook and the enhancement number, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may be configured to transmit uplink control information (UCI), a portion of which may include hybrid automatic repeat request (HARQ) acknowledgment (ACK) or negative acknowledgment (NACK) information. A codebook type associated with encoding the HARQ ACKs and/or NACKs (the combination thereof referred to herein as HARQ-ACK) may be semi-static or dynamic. The HARQ-ACK may be code-block group (CBG) based and/or transport block (TB) based. In some cases, the portion of the UCI that is to carry such information may further include a scheduling request (SR), a channel state indication (CSI), and/or another type of information.

A size (e.g., a number of bits) of the HARQ-ACK depends on a number of physical downlink shared channel (PDSCH) transmissions for which feedback is to be provided, a number of TBs, a number of CBGs per TB, and a number of component carriers. Thus, as any of the above factors increase in number, the size of the HARQ-ACK increases. However, in some wireless networks, a payload size of the UCI is limited. Additionally, the information provided by a single bit ACK or NACK is limited.

In some aspects, techniques for transmitting enhanced UCI are provided herein. Enhanced UCI may include one or more bits of information for each NACK bit, thereby enabling a UE to provide a BS more information regarding a failed transmission, which may facilitate more efficient retransmission on the part of the BS. In some aspects, the BS may control the number of additional bits included in the enhanced UCI by providing an enhancement number to the UE. The enhancement number may be selected based on a rough estimate of a number of NACK bits expected to be sent. In this manner, a BS and UE may synchronize communications and exchange information that may facilitate more efficient retransmissions and/or the like.

Figure 3:
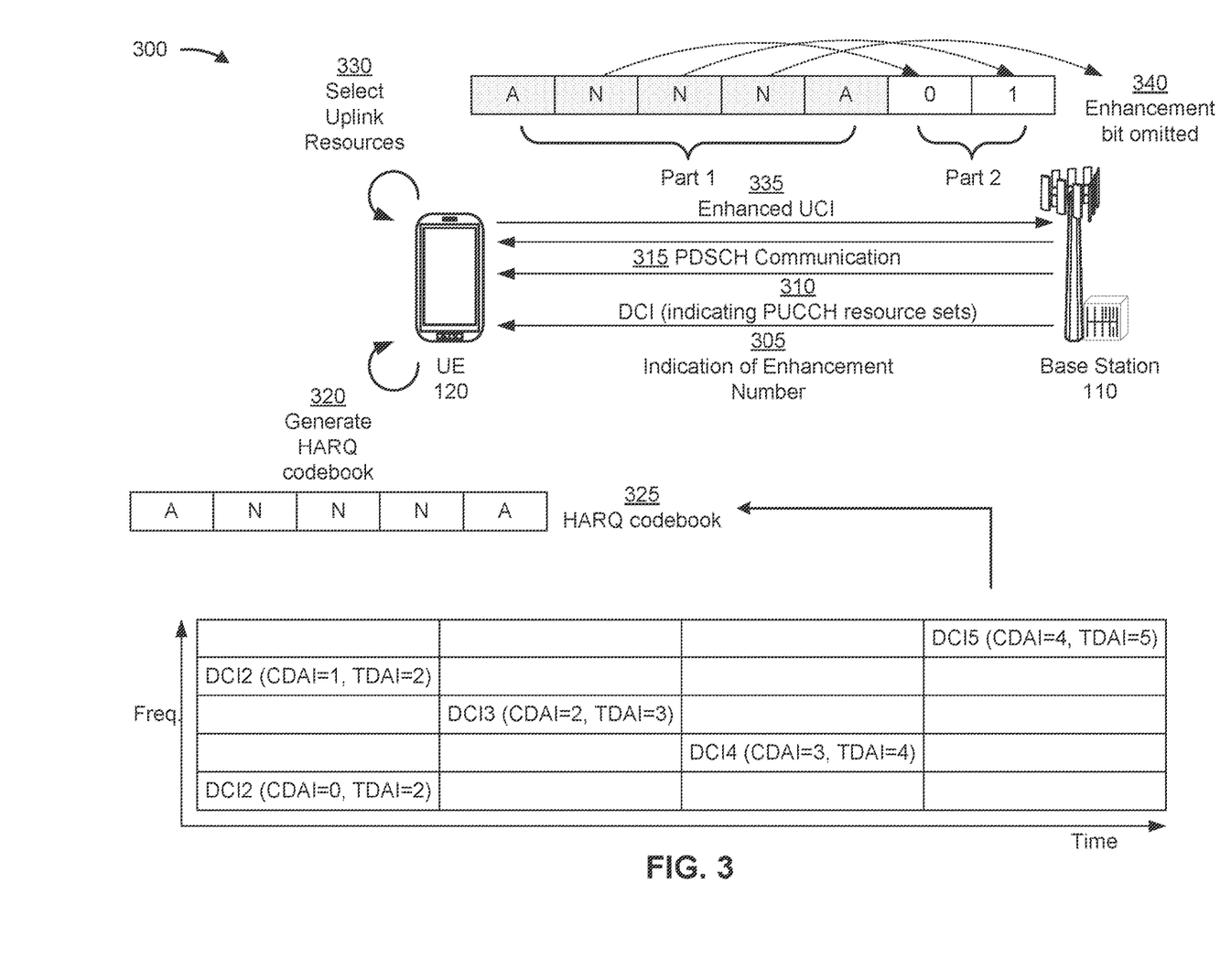
FIG. 3 is a diagram illustrating an example of uplink control information for uplink transmission, in accordance with various aspects of the present disclosure.

FIG. 3 is a diagram illustrating an example 300 of UCI enhancement for uplink transmission, in accordance with various aspects of the present disclosure. As shown, a BS 110 and a UE 120 may communicate with one another.

As shown by reference number 305, the BS 110 may transmit, and the UE 120 may receive, an indication of an enhancement number. In some aspects, the indication of the enhancement number may be provided via a radio resource control (RRC) message. The enhancement number may be based at least in part on an estimated number of NACK bits in a set of feedback bits that the BS 110 expects to receive from the UE 120. In some aspects, the enhancement number may be based at least in part on a total downlink assignment index (tDAI). For example, the enhancement number can be proportional to the value of tDAI.

As shown by reference number 310, the BS 110 may transmit, and the UE 120 may receive, downlink control information (DCI) that indicates multiple physical uplink control channel (PUCCH) resource sets. As shown by reference number 315, the BS 110 may transmit, and the UE 120 may receive, a physical downlink shared channel (PDSCH) communication. As shown by reference 320, the UE 120 may generate a HARQ codebook 325 based on the PDSCH communication.

The HARQ codebook 325 indicates a plurality of NACK bits, each corresponding to a communication failure. The resources of the PDSCH communication are represented in FIG. 3 as a grid, where each cell represents a slot in the time-domain and a frequency-domain allocation (e.g., a component carrier, a bandwidth part, and/or the like). For example, the first NACK (shown as an "N") in the HARQ codebook 325 may correspond to the PDSCH resource containing the DCI2, which is indicated as having a counter downlink assignment index (CDAI) of 1 and a total DAI of 2. The second NACK may correspond to the PDSCH resource containing the DCI3, and the third NACK may correspond to the PDSCH resource containing the DCI4. The respective NACKs may represent a failure of the PDSCH communication, a missing DCI, and/or the like.

As shown by reference number 330, the UE 120 may select uplink communication resources to be used to transmit enhanced UCI to the BS 110. The UE 120 may select the communication resources based at least in part on a size of the HARQ codebook 325 and the enhancement number. In some aspects, selecting the uplink communication resources includes selecting a PUCCH resource set of the PUCCH resource sets indicated by the BS 110. In some aspects, selecting the uplink communication resources may include selecting a plurality of physical resource blocks (PRBs) of a selected PUCCH resource set.

As shown by reference number 335, the UE 120 may transmit, and the BS 110 may receive, the enhanced UCI using the selected uplink communication resources. The enhanced UCI may include a set of feedback bits (shown as "Part 1") and a set of enhancement bits (shown as "Part 2"). The set of feedback bits may include at least one NACK bit and the set of enhancement bits indicate information associated with the at least one NACK bit. An order of the enhancement bits of the set of enhancement bits may be mapped to an order of NACK bits in the set of feedback bits, as shown. In some aspects, the enhancement bits may indicate a transmission (or suggested) signal-to-interference-plus-noise ratio (SINR), an indication that a modulation and coding scheme (MCS) index should be degraded by a specified number, an indication that DCI was missing, and/or the like.

In some aspects, as is further shown in FIG. 3, the UE 120 may determine that a quantity of enhancement bits of the set of enhancement bits is greater than the enhancement number. In the illustrated example, the enhancement number may be 2, whereas the number of enhancement bits (e.g., the number of NACK bits) is three. In that case, the UE 120 may omit one or more of the set of enhancement bits during transmission of the enhanced UCI. In some aspects, consistent with the mapping of the order of NACK bits to the order of enhancement bits, the UE may omit enhancement bits that would be positioned sequentially after the last enhancement bit that can be included according to the enhancement number. For example, as shown by reference number 340, a third enhancement bit, corresponding to the third NACK bit, would be omitted in the transmission of the enhanced UCI.

In some aspects, the enhanced UCI described herein may include one or more bits of information for each NACK bit, thereby enabling a UE to provide a BS more information regarding a failed transmission, which may facilitate more efficient retransmission on the part of the BS. In some aspects, the BS may control the number of additional bits included in the enhanced UCI by providing an enhancement number to the UE. The enhancement number may be selected based on a rough estimate of a number of NACK bits expected to be sent. In this manner, a BS and UE may synchronize communications and exchange information that may facilitate more efficient retransmissions and/or the like.

As indicated above, FIG. 3 is provided as an example. Other examples may differ from what is described with respect to FIG. 3.

Figure 4:
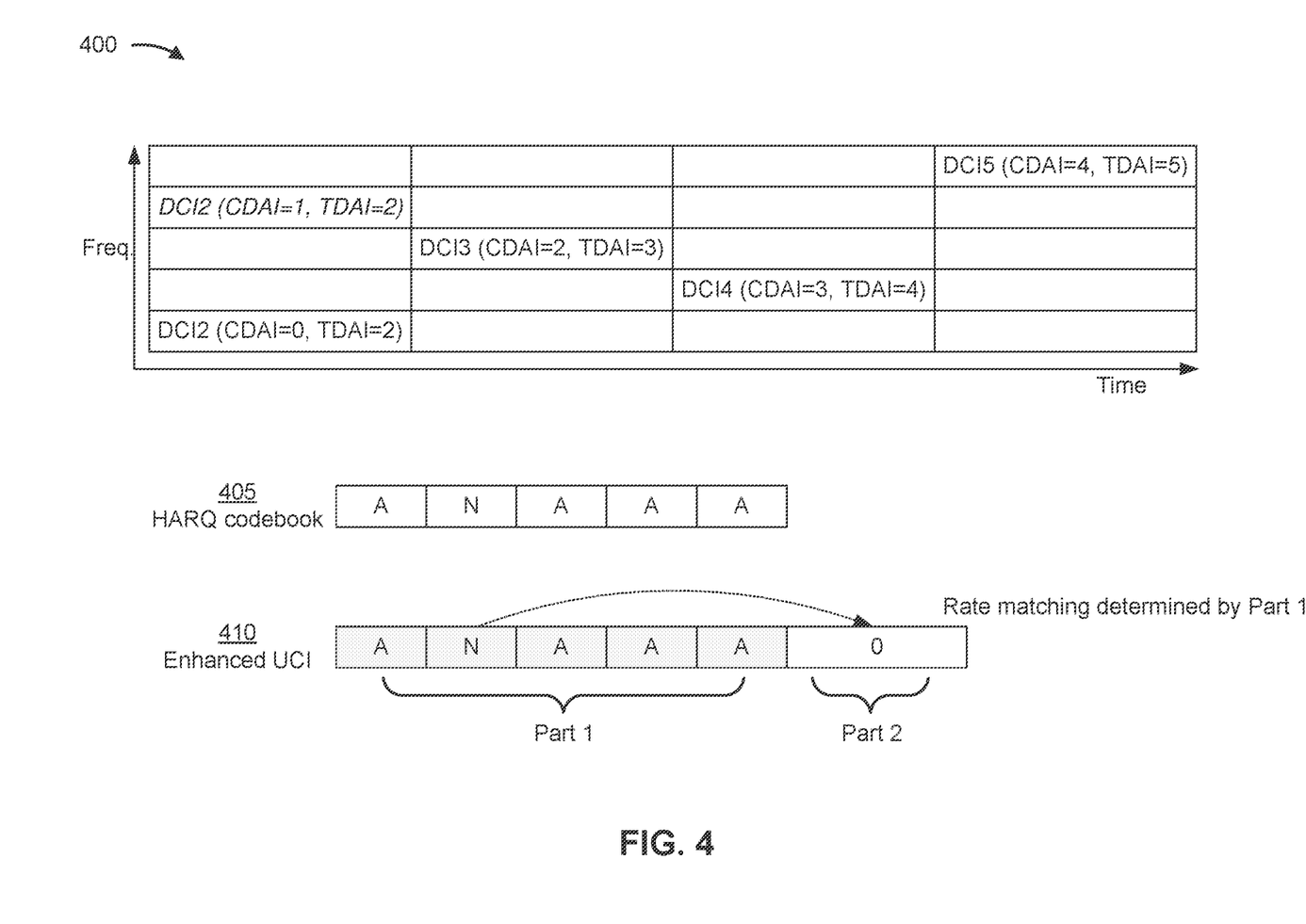
FIGS. 4 and 5 are diagrams illustrating examples of uplink control information enhancement for uplink transmission, in accordance with various aspects of the present disclosure.

FIG. 4 is a diagram illustrating an example 400 of UCI enhancement for uplink transmission, in accordance with various aspects of the present disclosure.

As shown, a HARQ codebook 405 may indicate a NACK bit corresponding to a communication failure. The resources of the PDSCH communication are represented in FIG. 4 as a grid, where each cell represents a slot in the time-domain and a frequency-domain allocation (e.g., a component carrier, a bandwidth part, and/or the like). For example, the NACK (shown as an "N") in the HARQ codebook 405 may correspond to the PDSCH resource containing the DCI2, which is indicated as having a counter downlink assignment index (CDAI) of 1 and a total DAI of 2, and the second NACK may correspond to the PDSCH resource containing the DCI3. The respective NACK may represent a failure of the PDSCH communication, a missing DCI, and/or the like.

The UE 120 may transmit, and the BS 110 may receive, an enhanced UCI 410. The enhanced UCI 410 may include a set of feedback bits (shown as "Part 1") and a set of enhancement bits (shown as "Part 2"). The set of feedback bits may include at least one NACK bit and the set of enhancement bits indicate information associated with the at least one NACK bit. An order of the enhancement bits of the set of enhancement bits may be mapped to an order of NACK bits in the set of feedback bits, as shown.

In some aspects, the UE 120 may determine that a quantity of enhancement bits is less than the enhancement number (e.g., that the number of NACK bits is less than the enhancement number). For example, in FIG. 4, the enhancement number may be 2, while there is only one enhancement bit. In response to making this determination, the UE 120 may transmit the set of enhancement bits (shown as one bit) using rate-matching based at least in part on the set of feedback bits. In some aspects, by using rate matching to transmit enhancement bits of an enhanced UCI, adaptive code rates may be used, thereby facilitating power savings and enabling more efficient communications.

As indicated above, FIG. 4 is provided as an example. Other examples may differ from what is described with respect to FIG. 4.

Figure 5:
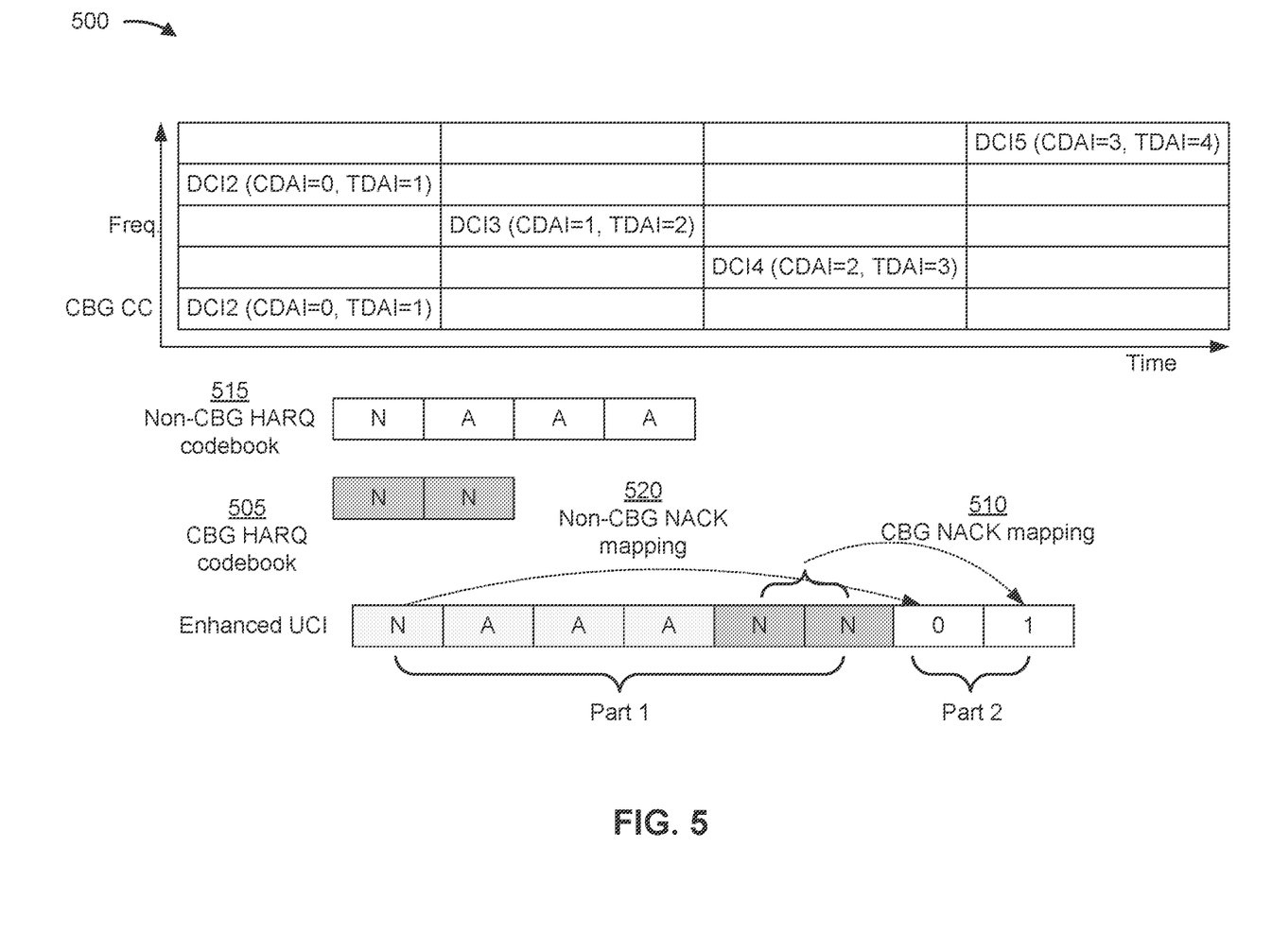

FIG. 5 is a diagram illustrating an example 500 of UCI enhancement for uplink transmission, in accordance with various aspects of the present disclosure.

As shown, a HARQ codebook may include a code block group (CBG) HARQ codebook 505 indicating a plurality of NACK bits. As shown by reference number 510, the UE 120 may map the plurality of NACK bits indicated by the CBG HARQ codebook to a single bit of the set of enhancement bits (shown as "CBG NACK mapping"). As shown in FIG. 5, the CBG HARQ codebook 505 may be associated with a first component carrier (CC).

An additional HARQ codebook 515, based on a PDSCH communication associated with additional CCS may be generated. The additional HARQ codebook 515 may include a non-CBG HARQ codebook and may indicate at least one NACK bit. As shown by reference number 520, the UE 120 may map the at least one NACK bit of the additional HARQ codebook 515 to an additional bit of the set of enhancement bits (shown as "Non-CBG NACK mapping"). In some aspects, the BS 110 may configure the CBG, thereby setting the sizes of the codebooks 505 and 515. In some aspects, the mapping techniques described above in connection with FIG. 5 may facilitate synchronization between the UE 120 and BS 110 with regard to HARQ-ACK reporting in the context of CBGs.

As indicated above, FIG. 5 is provided as an example. Other examples may differ from what is described with respect to FIG. 5.

Figure 6:
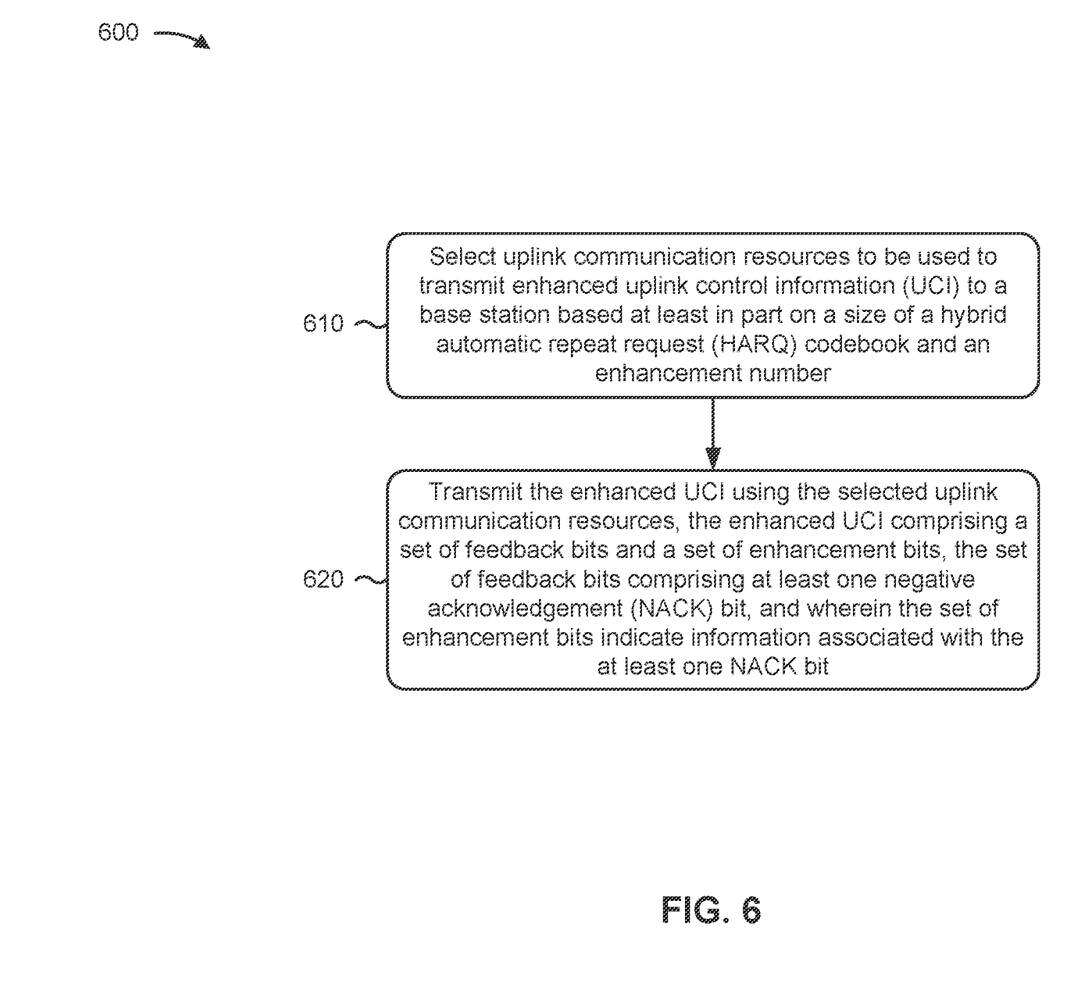
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with enhanced UCI for uplink transmissions.

As shown in FIG. 6, in some aspects, process 600 may include selecting uplink communication resources to be used to transmit enhanced UCI to a BS based at least in part on a size of a HARQ codebook and an enhancement number (block 610). For example, the UE (e.g., using controller/processor 280, memory 282, and/or the like) may select uplink communication resources to be used to transmit enhanced UCI to a base station based at least in part on a size of a HARQ codebook and an enhancement number, as described above. For example, when multiple PUCCH resource sets are configured, the UE may determine the selected PUCCH resource set based on a size of a HARQ codebook and an enhancement number. In another example, when a PUCCH is configured with multiple physical resource blocks, the UE may determine the selected number of physical resource blocks based on a size of a HARQ codebook and an enhancement number.

As further shown in FIG. 6, in some aspects, process 600 may include transmitting the enhanced UCI using the selected uplink communication resources, the enhanced UCI comprising a set of feedback bits and a set of enhancement bits, the set of feedback bits comprising at least one NACK bit, and wherein the set of enhancement bits indicate information associated with the at least one NACK bit (block 620). For example, the UE (e.g., using transmit processor 264, controller/processor 280, memory 282, and/or the like) may transmit the enhanced UCI using the selected uplink communication resources, the enhanced UCI comprising a set of feedback bits and a set of enhancement bits, the set of feedback bits comprising at least one NACK bit, as described above. In some aspects, the set of enhancement bits indicate information associated with the at least one NACK bit.

Process 600 may include additional aspects, such as any single aspect or any combination of aspects described below and/or in connection with one or more other processes described elsewhere herein.

In a first aspect, selecting the uplink communication resources comprises selecting a PUCCH resource set.

In a second aspect, alone or in combination with the first aspect, selecting the uplink communication resources comprises selecting a plurality of physical resource blocks (PRBs) of a selected PUCCH resource set.

In a third aspect, alone or in combination with one or more of the first and second aspects, the set of enhancement bits comprises one or more bits, each of the one or more bits corresponding to a NACK bit and indicating information about an associated failed communication.

In a fourth aspect, alone or in combination with one or more of the first through third aspects, the enhancement number is based at least in part on an estimated number of NACK bits in the set of feedback bits.

In a fifth aspect, alone or in combination with one or more of the first through fourth aspects, the enhancement number is based at least in part on a total downlink assignment index (tDAI).

In a sixth aspect, alone or in combination with one or more of the first through fifth aspects, process 600 includes receiving, from the base station, an indication of the enhancement number.

In a seventh aspect, alone or in combination with one or more of the first through sixth aspects, the indication of the enhancement number is provided via a radio resource control (RRC) message.

In an eighth aspect, alone or in combination with one or more of the first through seventh aspects, an order of the enhancement bits of the set of enhancement bits is mapped to an order of NACK bits in the set of feedback bits.

In a ninth aspect, alone or in combination with one or more of the first through eighth aspects, the enhanced UCI comprises a first set of bits, corresponding to the HARQ codebook, and a second set of bits, corresponding to the enhancement number.

In a tenth aspect, alone or in combination with one or more of the first through ninth aspects, process 600 includes receiving, from the base station, a PDSCH communication; generating the HARQ codebook based on the PDSCH communication, wherein the HARQ codebook is indicating a plurality of NACK bits; and determining a set of enhancement bits, wherein each of the set of enhancement bits corresponds to one of the plurality of NACK bits.

In an eleventh aspect, alone or in combination with one or more of the first through tenth aspects, process 600 includes determining that a quantity of enhancement bits of the set of enhancement bits is greater than the enhancement number; and omitting one or more of the set of enhancement bits during transmission of the UCI.

In a twelfth aspect, alone or in combination with one or more of the first through eleventh aspects, process 600 includes determining that a quantity of enhancement bits of the set of enhancement bits is less than the enhancement number; and transmitting the set of enhancement bits using rate-matching based at least in part on the set of feedback bits.

In a thirteenth aspect, alone or in combination with one or more of the first through twelfth aspects, the HARQ codebook comprises a code block group (CBG) HARQ codebook indicating a plurality of NACK bits, the method further comprising: mapping the plurality of NACK bits indicated by the CBG HARQ codebook to a single bit of the set of enhancement bits.

In a fourteenth aspect, alone or in combination with one or more of the first through thirteenth aspects, the CBG HARQ codebook is associated with a first component carrier, the method further comprising: generating an additional HARQ codebook based on a PDSCH communication associated with a second component carrier, wherein the additional HARQ codebook comprises a non-CBG HARQ codebook and indicates at least one NACK bit; and mapping the at least one NACK bit of the additional HARQ codebook to an additional bit of the set of enhancement bits.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
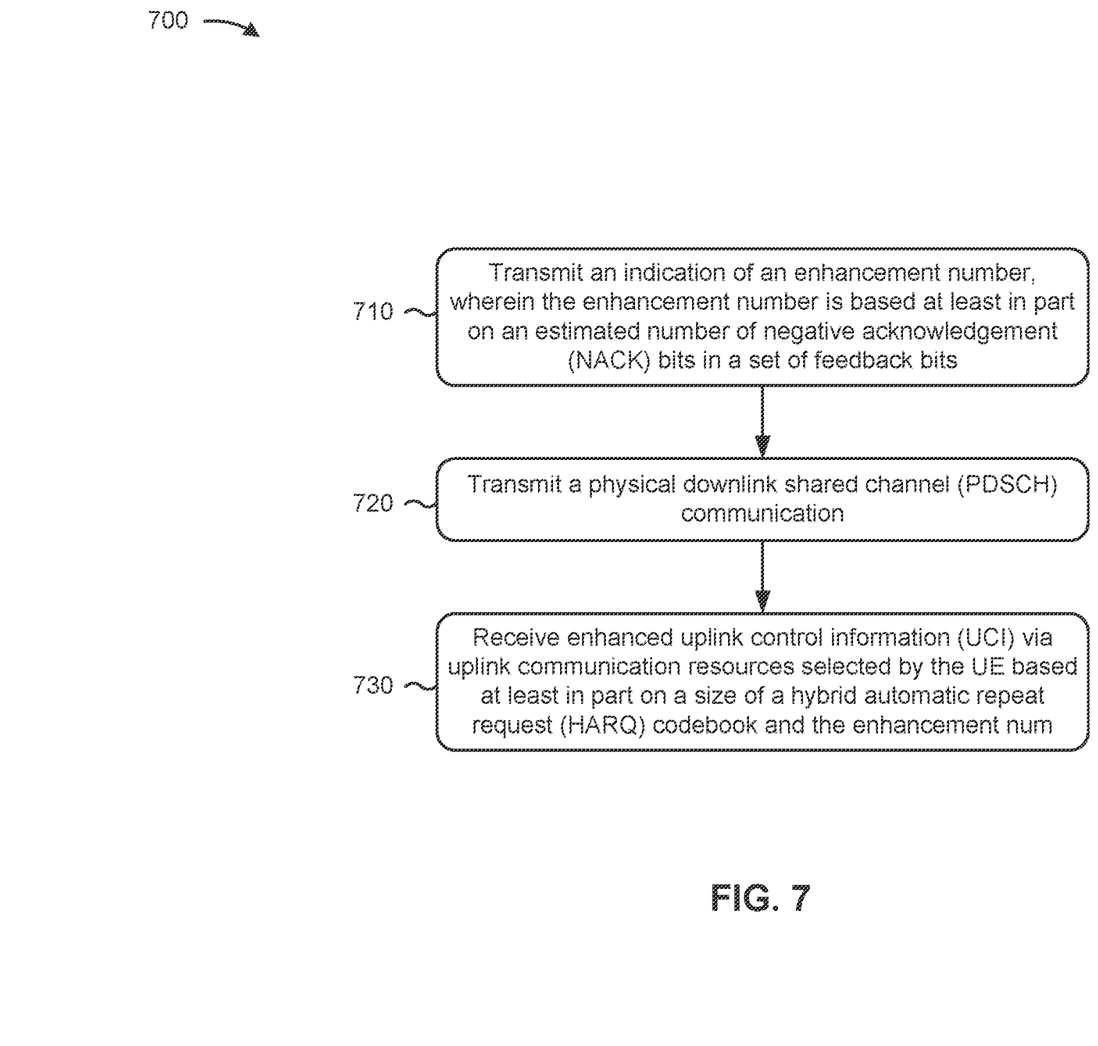
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110 and/or the like) performs operations associated with enhanced UCI for uplink transmission.

As shown in FIG. 7, in some aspects, process 700 may include transmitting, to a UE, an indication of an enhancement number, wherein the enhancement number is based at least in part on an estimated number of NACK bits in a set of feedback bits (block 710). For example, the BS (e.g., using transmit processor 220, controller/processor 240, memory 242, and/or the like) may transmit, to UE, an indication of an enhancement number, as described above. In some aspects, the enhancement number is based at least in part on an estimated number of NACK bits in a set of feedback bits.

As further shown in FIG. 7, in some aspects, process 700 may include transmitting, to the UE, a PDSCH communication (block 720). For example, the BS (e.g., using transmit processor 220, controller/processor 240, memory 242, and/or the like) may transmit, to the UE, a PDSCH communication, as described above.

As further shown in FIG. 7, in some aspects, process 700 may include receiving enhanced UCI via uplink communication resources selected by the UE based at least in part on a size of a HARQ codebook and the enhancement number (block 730). For example, the BS (e.g., using receive processor 238, controller/processor 240, memory 242, and/or the like) may receive enhanced UCI via uplink communication resources selected by the UE based at least in part on a size of a HARQ codebook and the enhancement number, as described above.

Process 700 may include additional aspects, such as any single aspect or any combination of aspects described below and/or in connection with one or more other processes described elsewhere herein.

In a first aspect, the selected uplink communication resources include a plurality of PRBs of a selected PUCCH resource set.

In a second aspect, alone or in combination with the first aspect, the enhanced UCI comprises a set of feedback bits and a set of enhancement bits, the set of feedback bits comprising at least one NACK bit, and the set of enhancement bits indicate information associated with the at least one NACK bit.

In a third aspect, alone or in combination with one or more of the first and second aspects, the set of enhancement bits comprises one or more bits, each of the one or more bits corresponding to a NACK bit and indicating information about an associated failed communication.

In a fourth aspect, alone or in combination with one or more of the first through third aspects, an order of the enhancement bits of the set of enhancement bits is mapped to an order of NACK bits in the set of feedback bits.

In a fifth aspect, alone or in combination with one or more of the first through fourth aspects, the enhanced UCI comprises a first set of bits, corresponding to the HARQ codebook, and a second set of bits, corresponding to the enhancement number.

In a sixth aspect, alone or in combination with one or more of the first through fifth aspects, a quantity of enhancement bits of the set of enhancement bits is greater than the enhancement number, and one or more of the set of enhancement bits is omitted during transmission of the UCI.

In a seventh aspect, alone or in combination with one or more of the first through sixth aspects, a quantity of enhancement bits of the set of enhancement bits is less than the enhancement number, and the UE transmits the set of enhancement bits using rate-matching based at least in part on the set of feedback bits.

In an eighth aspect, alone or in combination with one or more of the first through seventh aspects, the HARQ codebook comprises a CBG HARQ codebook indicating a plurality of NACK bits, and the plurality of NACK bits indicated by the CBG HARQ codebook are mapped to a single bit of the set of enhancement bits.

In a ninth aspect, alone or in combination with one or more of the first through eighth aspects, the CBG HARQ codebook is associated with a first component carrier, wherein the UE generates an additional HARQ codebook based on a PDSCH communication associated with a second component carrier, and wherein the additional HARQ codebook comprises a non-CBG HARQ codebook and indicates at least one NACK bit, and the at least one NACK bit of the additional HARQ codebook is mapped to an additional bit of the set of enhancement bits.

In a tenth aspect, alone or in combination with one or more of the first through ninth aspects, the enhancement number is based at least in part on a tDAI.

In an eleventh aspect, alone or in combination with one or more of the first through tenth aspects, the indication of the enhancement number is provided via an RRC message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   memory; and
   one or more processors, coupled to the memory, configured to:
   select uplink communication resources to be used to transmit enhanced uplink control information (UCI) to a network node based at least in part on a size of a hybrid automatic repeat request (HARQ) codebook and an enhancement number; and
   transmit the enhanced UCI using the selected uplink communication resources, wherein the enhanced UCI comprises a set of feedback bits and a set of enhancement bits, the set of feedback bits comprising at least one negative acknowledgement (NACK) bit, wherein the set of enhancement bits indicate information associated with the at least one NACK bit, and wherein:
   one or more of the set of enhancement bits are omitted from the enhanced UCI during transmission of the enhanced UCI when a quantity of enhancement bits of the set of enhancement bits is greater than the enhancement number, or
   the set of enhancement bits are transmitted using rate-matching based at least in part on the set of feedback bits when the quantity of enhancement bits of the set of enhancement bits is less than the enhancement number.

2. The UE of claim 1, wherein the one or more processors, to select the uplink communication resources, are configured to select a physical uplink control channel (PUCCH) resource set.

3. The UE of claim 1, wherein the one or more processors, to select the uplink communication resources, are configured to select a plurality of physical resource blocks (PRBs) of a selected physical uplink control channel (PUCCH) resource set.

4. The UE of claim 1, wherein the set of enhancement bits comprises one or more bits, each of the one or more bits corresponding to a NACK bit of the at least one NACK bit and indicating information about an associated failed communication.

5. The UE of claim 1, wherein the enhancement number is based at least in part on an estimated number of NACK bits in the set of feedback bits.

6. The UE of claim 1, wherein the enhancement number is based at least in part on a total downlink assignment index (tDAI).

7. The UE of claim 1, wherein the one or more processors are further configured to receive, from the network node, an indication of the enhancement number.

8. The UE of claim 7, wherein the indication of the enhancement number is provided via a radio resource control (RRC) message.

9. The UE of claim 1, wherein an order of enhancement bits of the set of enhancement bits is mapped to an order of NACK bits in the set of feedback bits.

10. The UE of claim 1, wherein the enhanced UCI comprises a first set of bits, corresponding to the HARQ codebook, and a second set of bits, corresponding to the enhancement number.

11. The UE of claim 1, wherein the one or more processors are further configured to:
receive, from the network node, a physical downlink shared channel (PDSCH) communication;
generate the HARQ codebook based on the PDSCH communication, wherein the HARQ codebook indicates a plurality of NACK bits; and
determine the set of enhancement bits, wherein each of the set of enhancement bits corresponds to one of the plurality of NACK bits.

12. The UE of claim 1, wherein the one or more processors are further configured to:
determine that the quantity of enhancement bits of the set of enhancement bits is greater than the enhancement number; and
omit the one or more of the set of enhancement bits during transmission of the enhanced UCI.

13. The UE of claim 1, wherein the one or more processors are further configured to:
determine that the quantity of enhancement bits of the set of enhancement bits is less than the enhancement number; and
transmit the set of enhancement bits using rate-matching based at least in part on the set of feedback bits.

14. The UE of claim 1, wherein the HARQ codebook comprises a code block group (CBG) HARQ codebook indicating a plurality of NACK bits, and wherein the one or more processors are further configured to map the plurality of NACK bits indicated by the CBG HARQ codebook to a single bit of the set of enhancement bits.

15. The UE of claim 14, wherein the CBG HARQ codebook is associated with a first component carrier, and wherein the one or more processors are further configured to:
generate an additional HARQ codebook based on a PDSCH communication associated with a second component carrier, wherein the additional HARQ codebook comprises a non-CBG HARQ codebook and indicates at least one NACK bit; and
map the at least one NACK bit of the additional HARQ codebook to an additional bit of the set of enhancement bits.

16. A network node for wireless communication, comprising:
memory; and
one or more processors, coupled to the memory, configured to:
transmit, to a user equipment (UE), an indication of an enhancement number, wherein the enhancement number is based at least in part on an estimated number of negative acknowledgement (NACK) bits in a set of feedback bits;
transmit, to the UE, a physical downlink shared channel (PDSCH) communication; and
receive enhanced uplink control information (UCI) via uplink communication resources selected by the UE based at least in part on a size of a hybrid automatic repeat request (HARQ) codebook and the enhancement number, wherein the enhanced UCI comprises a set of enhancement bits comprising at least one negative acknowledgement (NACK) bit, and wherein a quantity of enhancement bits of the set of enhancement bits is greater than the enhancement number, and wherein one or more of the set of enhancement bits is omitted from the enhanced UCI.

17. The network node of claim 16, wherein the selected uplink communication resources include a plurality of physical resource blocks (PRBs) of a selected physical uplink control channel (PUCCH) resource set.

18. The network node of claim 16, wherein the enhanced UCI further comprises a set of feedback bits and wherein the set of enhancement bits indicate information associated with the at least one NACK bit.

19. The network node of claim 18, wherein the set of enhancement bits comprises one or more bits, each of the one or more bits corresponding to a NACK bit and indicating information about an associated failed communication.

20. The network node of claim 18, wherein an order of the enhancement bits of the set of enhancement bits is mapped to an order of NACK bits in the set of feedback bits.

21. The network node of claim 18, wherein the enhanced UCI comprises a first set of bits, corresponding to the HARQ codebook, and a second set of bits, corresponding to the enhancement number.

22. The network node of claim 18, wherein the HARQ codebook comprises a code block group (CBG) HARQ codebook indicating a plurality of NACK bits, and wherein the plurality of NACK bits indicated by the CBG HARQ codebook are mapped to a single bit of the set of enhancement bits.

23. The network node of claim 22, wherein the CBG HARQ codebook is associated with a first component carrier, wherein an additional HARQ codebook is based on a PDSCH communication associated with a second component carrier, wherein the additional HARQ codebook comprises a non-CBG HARQ codebook and indicates at least one NACK bit; and wherein the at least one NACK bit of the additional HARQ codebook is mapped to an additional bit of the set of enhancement bits.

24. The network node of claim 16, wherein the enhancement number is based at least in part on a total downlink assignment index (tDAI).

25. The network node of claim 16, wherein the indication of the enhancement number is provided via a radio resource control (RRC) message.

26. A method of wireless communication performed by a user equipment (UE), comprising:
selecting uplink communication resources to be used to transmit enhanced uplink control information (UCI) to a base station based at least in part on a size of a hybrid automatic repeat request (HARQ) codebook and an enhancement number; and
transmitting the enhanced UCI using the selected uplink communication resources, the enhanced UCI comprising a set of feedback bits and a set of enhancement bits, the set of feedback bits comprising at least one negative acknowledgement (NACK) bit, and wherein the set of enhancement bits indicate information associated with the at least one NACK bit, and wherein:
one or more of the set of enhancement bits are omitted from the enhanced UCI during transmission of the enhanced UCI when a quantity of enhancement bits of the set of enhancement bits is greater than the enhancement number, or the set of enhancement bits are transmitted using rate-matching based at least in part on the set of feedback bits when the quantity of enhancement bits of the set of enhancement bits is less than the enhancement number.

27. The method of claim 26, wherein the set of enhancement bits comprises one or more bits, each of the one or more bits corresponding to a NACK bit and indicating information about an associated failed communication.

28. The method of claim 26, wherein the enhancement number is based at least in part on an estimated number of NACK bits in the set of feedback bits.

29. A method of wireless communication performed by a network node, comprising:

transmitting, to a user equipment (UE), an indication of an enhancement number, wherein the enhancement number is based at least in part on an estimated number of negative acknowledgement (NACK) bits in a set of feedback bits;

transmitting, to the UE, a physical downlink shared channel (PDSCH) communication; and receiving enhanced uplink control information (UCI) via uplink communication resources selected by the UE based at least in part on a size of a hybrid automatic repeat request (HARQ) codebook and the enhancement number, wherein the enhanced UCI comprises a set of enhancement bits comprising at least one negative acknowledgement (NACK) bit, and wherein a quantity of enhancement bits of the set of enhancement bits is greater than the enhancement number, and wherein one or more of the set of enhancement bits is omitted from the enhanced UCI.

30. The method of claim 29, wherein the enhanced UCI comprises a set of feedback bits wherein the set of enhancement bits indicate information associated with the at least one NACK bit.

* * * * *